Figure 1:
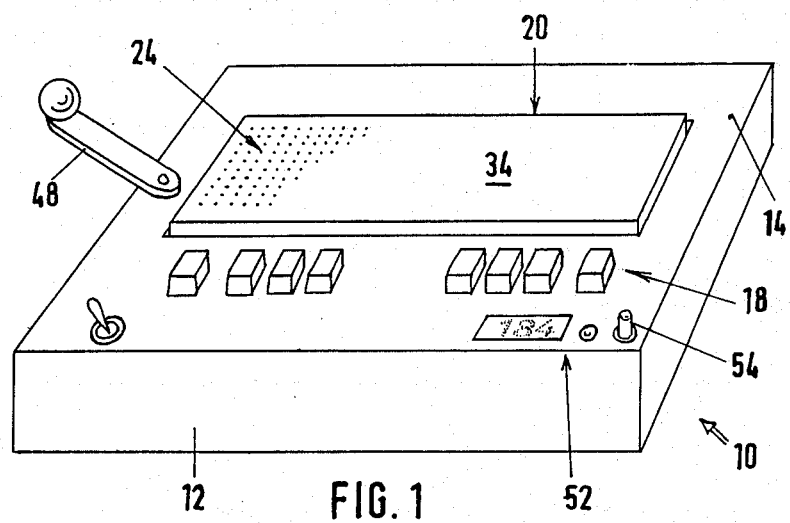

United States Patent [19]

Hoffarth

[11] Patent Number: 4,898,536

[45] Date of Patent: Feb. 6, 1990

[54] DEVICE FOR DISPLAYING GRAPHIC INFORMATION

[76] Inventor: Rainer Hoffarth, Bellnhauser Muhle 1, D-3555 Fronhausen, Fed. Rep. of Germany

[21] Appl. No.: 204,259

[22] Filed: Jun. 9, 1988

Related U.S. Application Data

[63] Continuation of Ser. No. 936,431, Dec. 1, 1986, abandoned.

[30] Foreign Application Priority Data

Dec. 11, 1985 [EP] European Pat. Off. ............ 85115789

[51] Int. Cl.⁴ .......................... G09B 21/02; B41J 3/32
[52] U.S. Cl. ..................................... 434/114; 340/407
[58] Field of Search ................. 340/407; 434/113, 114

[56] References Cited

U.S. PATENT DOCUMENTS

| | | | |
|---|---|---|---|
| 3,659,354 | 5/1972 | Sutherland | 340/407 |
| 3,987,438 | 10/1976 | Lindenmueller et al. | 434/114 |
| 4,033,053 | 6/1977 | Engler | 434/114 |
| 4,108,066 | 8/1978 | Andersson . | |
| 4,191,945 | 3/1980 | Hannen et al. | 434/114 |
| 4,266,936 | 5/1981 | Rose et al. | 434/114 |
| 4,283,178 | 8/1981 | Tetzlaff | 434/114 |
| 4,664,632 | 5/1987 | Tretiakoff et al. | 434/114 |

FOREIGN PATENT DOCUMENTS

| | | | |
|---|---|---|---|
| 3035852 | 5/1982 | Fed. Rep. of Germany | 434/113 |
| 2484114 | 12/1981 | France | 434/113 |

*Primary Examiner*—Charles T. Jordan
*Assistant Examiner*—Richard W. Wendtland
*Attorney, Agent, or Firm*—Fred Philpitt

[57] ABSTRACT

A device (10) for displaying information, in particular more extensive braille texts, includes a pattern setter (16) and eraser means (36). Above the pattern setter, there is a cover plate (14) comprising at least one removable character carrier (20) composed of a plurality of form-fit profiles (30). In or between the latter, rows of spring-biased pins (22) are guided which have undercuts (42) adapted to be locked by lateral teeth (40) of elastic strips (38). Only those pins which have been lifted by the pattern setter (16), e.g. according to programmed control, project with their tips (24) from the top face (34) of the character carrier (20) which may be detached for independent use as a reading board, printing plate, deep-drawing die, etc. For erasing, the strips (38) are shifted between the profiles by half the grid distance (a/2) so that the teeth (40) will release the set pins for return to their starting position.

9 Claims, 5 Drawing Sheets

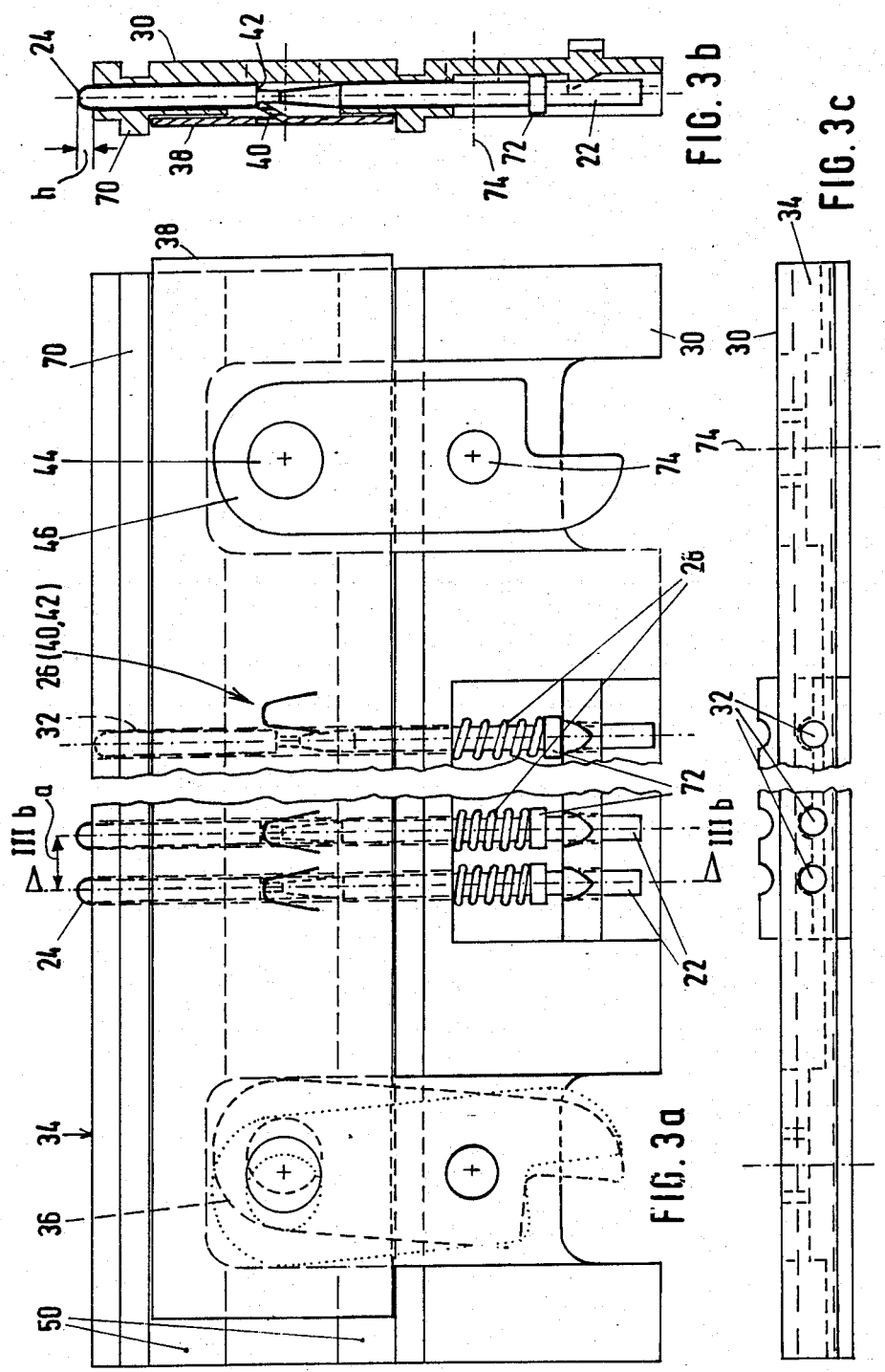

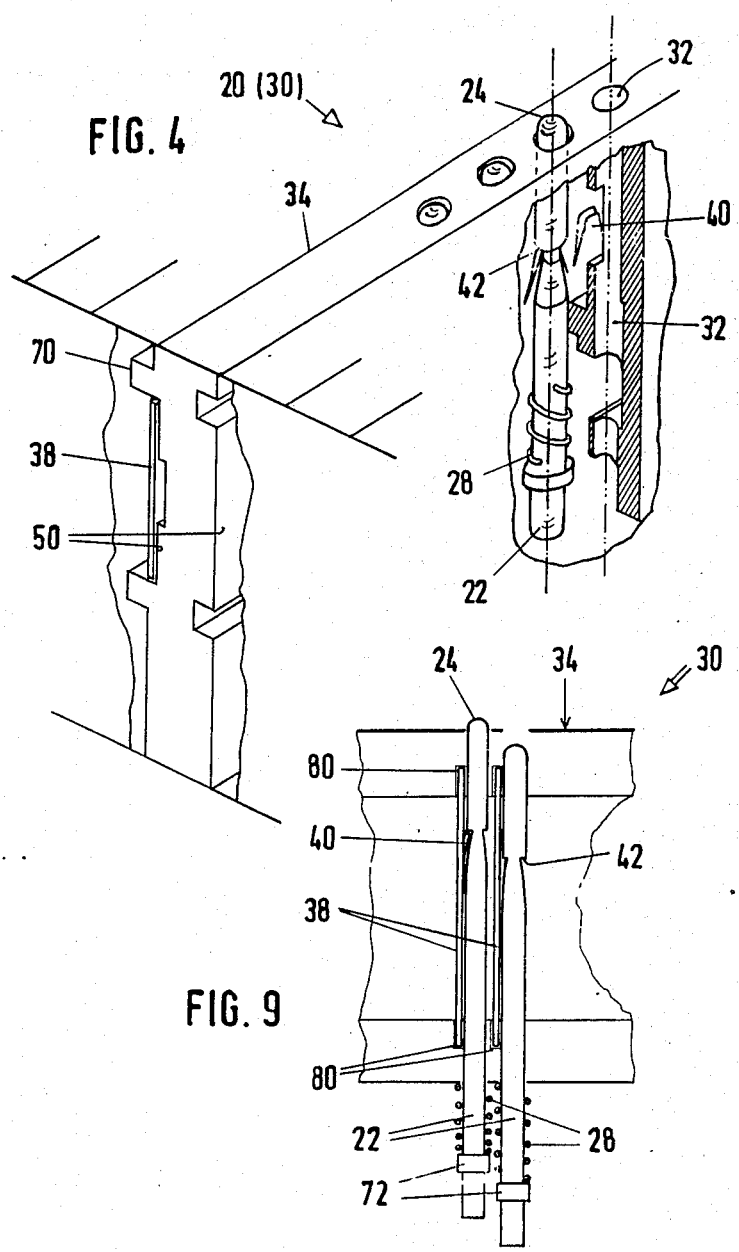

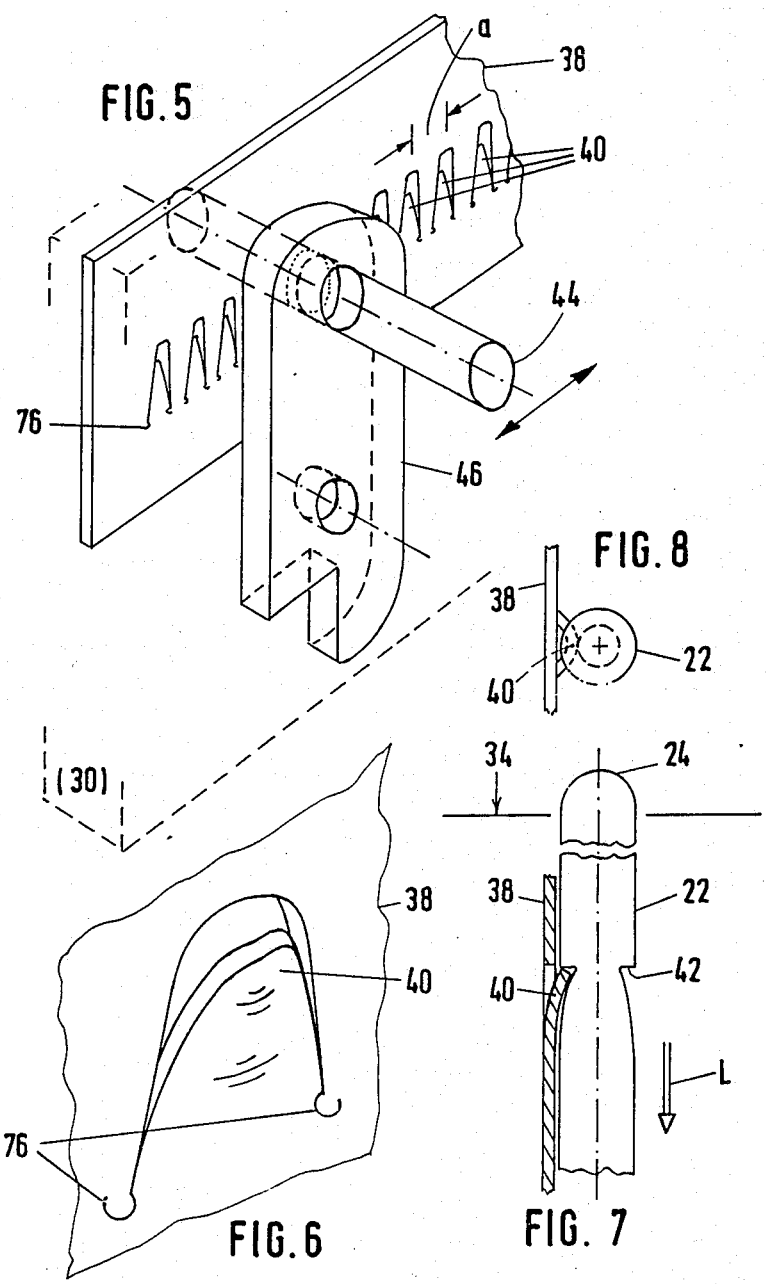

DEVICE FOR DISPLAYING GRAPHIC INFORMATION

This is a continuation of application Ser. No. 936,431, filed Dec. 1, 1986, now abandoned and the benefits of 35 USC 120 are claimed relative to it. PCT/EPO 85115789.1 filed Dec. 11, 1985

FIELD OF THE INVENTION

The invention relates to a device for tactually and visually displaying graphic information, in particular braille texts, according to the generic part of claim 1. It is primarily intended for use as a versatile and economic reading means for the blind, but not limited to such application.

BACKGROUND OF THE INVENTION

Various devices have heretofore been proposed for tactually and visually displaying graphic information, in particular braille tests. In US-PS 3,622,759, a print-reading machine for the blind has been disclosed that includes a perforated endless belt for interposing pellets between an array of tappet-like punches and vertically movable pads. The pellets may be of cubical, spherical or other shape and serve as intermediate members transmitting the upward punch motion. When lifted, the pads may be probed for reading by sensing units. The mechanism is rather complex and must be operated in a series of steps.

Accordingly, the setting procedure appears tedious and prone to troubles. The information is retained on the device to the location of which the blind reader must go in order to get access to the text displayed.

Smaller apparatuses of different types permit setting single lines. For example, according to DE-OS 30 33 078, a perforated drum may be provided through which pins can be moved electromagnetically so as to form, with their tips, a projecting line to be sensed tactually. However, such devices are quite expensive and hardly or not at all suitable for continuous reading in the manner almost exclusively practised by the seeing.

Thus there is a lack in the prior art of less expensive means for the blind that would enable them to read information presented by other than printed media. Up to now, news in brief, short notices or the like would generally reach the blind only by hearing, although such bulletins are absolutely normal reading matter for the remaining population.

OBJECTS OF THE INVENTION

It is an important object of the invention to provide ready access to the blind of reading matter that is usually neither typewritten nor tied to a paper support.

Another object of the invention consists of making readable by the blind non-printed graphic information that is of an essentially short-lived nature or of passing interest but is nonetheless worth temporary retention beyond merely hearing.

A further object of the invention is the provision of a graphic information display by way of a sturdy and inexpensive device suited for easy use over long periods of time.

SUMMARY OF THE INVENTION

A principal feature of the invention is constituted by a detachable character carrier that supports pins to be locked for temporarily conserving a desired pattern. Thus the device may be used for setting a text retained on the carrier until an eraser means is operated. As required, the character carrier may be sensed at the location of the device, i.e. when mounted to or inserted in a cover plate on top of the pattern setter, or it may be employed as an independent mobile display. Preferably, the character carrier is designed as a reading board, printing plate, etc. For example, it may be put up at some location to form an exchangeable bulletin board so that superseded information may be replaced by topical one until erased for new use. Consequently, utilizing the invention exceeds by far the potential provided by conventional devices using reading pins, e.g. according to US-PS 4,108,066 and 4,266,936.

The invention also contemplates to combine in a common carrier structure the locking and eraser means for retaining and releasing the pins, respectively. Isolated erasure of a text pattern is thus possible, as may be desired if previous information has become obsolete although new information is not available or if the character carrier is meant to remain blank for some indefinite time.

SPECIALIZATIONS OF THE INVENTION

The character carrier may be composed of a plurality of like profiles in or between which at least one row each of pins is guided, and each pin may be movable in a bore and be biassed towards its starting position by a spring, a rubber string or the like. Due to such design, the size of the carrier may be varied freely. Preferably, the profiles extend transversely to the top face. As each profile may be very narrow, it is possible to obtain lightweight carriers which accommodate banks of characters such as indicated by the following boss numbers:

| | |
|---|---|
| 70 × 100 = 7,000 | 120 × 240 = 28,800 |
| 100 × 120 = 12,000 | 180 × 240 = 43,200 |
| 120 × 180 = 21,600 | 200 × 300 = 60,000 | it being understood that different areas and quantities are also feasible.

The locking and eraser means may comprise a plurality of strips guided such that they positively engage one row of pins each and that they are movable along the profiles in a direction transverse to the top face of the character carrier. The strips may be moved singly or in groups or all together, e.g. by means of a shaft extending therethrough; engaging dogs may provide a connection of the shaft to a frame and a crank or to a gear motor. The strips can be readily manufactured to accurate size, in particular of elastic material such as spring steel, plastics, etc.

They replace quantities of conventional locking and erasing components and may include rows of teeth that project from the strip plane at an acute angle. Beneath its tip, each pin has at least one undercut or shoulder whereat the adjacent tooth may become locked. For setting, it will do to lift each pin against the force of its biassing spring to a position where the neighboring tooth provides a detent. Erasing is effected by moving the strip and thus its teeth in a direction parallel to the carrier top face and transverse to the pin axes whereby the pins are unlocked and return to their starting positions.

Locking is facilitated if the teeth are curved, especially convex relative to the strip plane. Such design is highly advantageous in that simple cylindrical pins may be used which require but one shoulder and a bearing or support for the biassing spring.

Easy use is enhanced if teeth and pins are arranged at equal grid distances, the strips being laterally shiftable by half the grid distance relative to the pin rows for quick erasure.

An arrangement of the profiles at distances identical to those between the pin rows will result in a square array of the character bank on the carrier. The design may further be improved by form-fitting the profiles in series, in a direction transverse to the pin rows, so that the top of the profiles jointly constitutes the exterior surface which is perforated by the openings of the bores wherein the pins are guided. Each profile may include guide faces, grooves, etc. for receiving the associated strip and/or pin row, e.g. by way of shells that enclose the respective guided element. This will greatly facilitate mounting and maintenance.

Means are also provided for manual or power-operated movement of the pattern setter by steps of half the grid distance each, especially in a lateral direction and/or along the profiles. The setting procedure thus takes very little time. The actual position of the setter may be indicated by tactual and visual means so that both the seeing and the blind can perceive the pattern presented.

An important embodiment of the pattern setter includes a plurality of levers whose points may engage the lower ends of the pins so that these can be lifted simply by actuating the levers. The invention further provides actuators, i.e. at least one stroke releaser, preferably a solenoid or electromagnet that can be controlled according to a coordinate matrix for movement along and transverse to the profiles. Alternatively, a group of staggered stroke releasers such as solenoids, pneumatic cylinders or the like may be arranged to act on the pins either directly or via intermediate members. Each stroke releaser may engage one lever, and when actuated, the lever points are aligned in a direction transverse to that of the pin rows. It is, therefore, easily possible to set a pin pattern by rows, the setter being moved on by one step each. In order to save space, the levers may be alternately borne by shafts which are opposed to each other beyond the group of stroke releasers therebetween. Each lever may be spring-biassed for engagement of the armature of the associated stroke releaser.

The invention also features a display embodiment wherein the character carrier is composed of a rack-like plurality of apertured plates. In such a piled structure, which is both lightweight and sturdy, the pins are guided in a direction vertical to the plane of the plates.

Moreover, at least two character carriers may be stacked for simultaneous setting, the pin length being dimensioned such that the lower pins engage the upper ones and thus serve as intermediate members for the setting procedure. More powerful stroke releasers are expedient for this design.

Yet another embodiment comprises means for also setting a pattern on the rear face or back page of the character carrier. This opens an additional utilization potential by virtually doubling the useful reading area.

Further features, particulars and advantages of the invention will become apparent from the wording of the claims and from the following detailed technical description.

IN THE ANNEXED DRAWINGS IS

Figure 2:
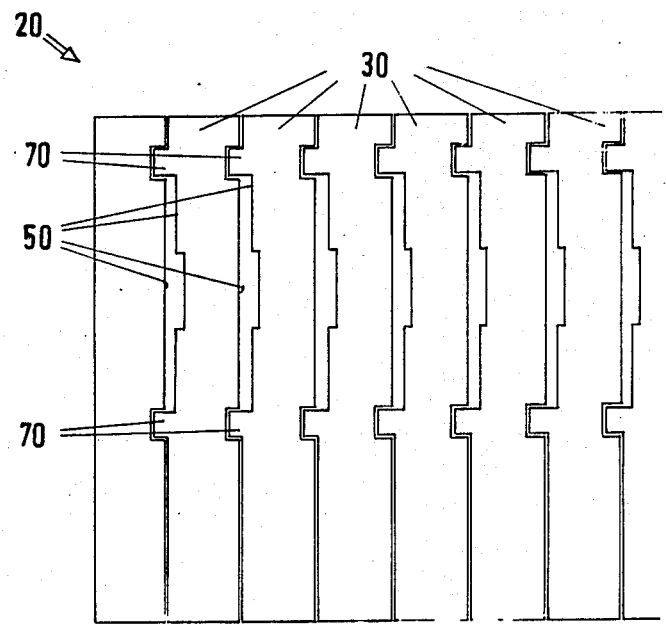
Figure 10:
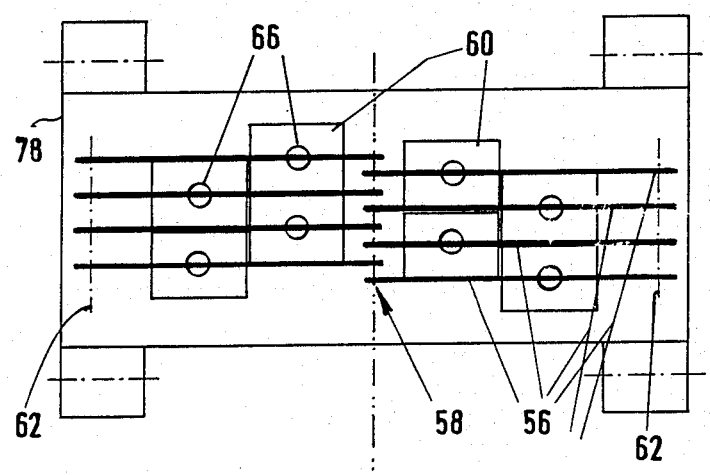
Figure 11:
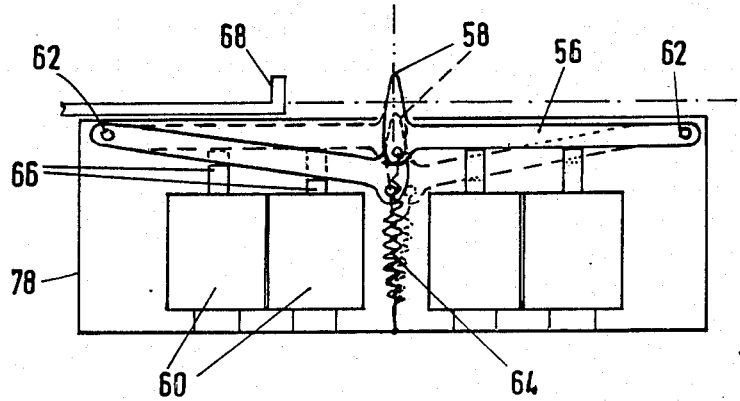

FIG. 1 a perspective view of a manually operable embodiment of a device according to the invention, FIG. 2 an enlarged partial side elevation of a character carrier, FIG. 3a a schematic front view of a character carrier profile, FIG. 3b a sectional view corresponding to line IIIb—IIIb in FIG. 3a, FIG. 3c a top view of the profile shown in FIG. 3a, FIG. 4 a schematic perspective view, partly sectional, of a character carrier profile, FIG. 5 a schematic perspective view of parts of locking and erasing means, FIG. 6 an enlarged perspective view of a locking arrangement, FIG. 7 a partly sectional side elevation of pin locking means, FIG. 8 a schematic top view of the arrangement shown in FIG. 7, FIG. 9 a schematic side elevation of a pin arrangement, FIG. 10 a schematic top view of setting means and FIG. 11 a cut-open side elevation of the means shown in FIG. 10.

DESCRIPTION

The embodiment of the device 10 shown in FIG. 1 includes a housing 12 with a cover plate 14 below which is a pattern setter 16. It can be operated by means of selector keys 18 in order to provide a desired pattern on a character carrier 20. Setting is effected by pins 22 whose tips 24 are slightly elevated or embossed relative to the top face 34 of the character carrier 20.

The latter comprises locking means 26 for the pins 22 as well as eraser means 36 adapted to return set pins into their basic position. The eraser means 36 can be operated by a crank 48. The actual condition of the pattern setter 16 can be observed at an optical indicator 52 and a tactual indicator 54. Lefthand in FIG. 1, there is schematically shown an on/off switch for the electrical equipment of the device 10.

The enlarged view of FIG. 2 shows the basic concept of the character carrier 20. It is composed of a plurality of profiles 30 having ledges 70 each of which engages the adjacent profile by form fit. Between neighboring profiles 30, there are in their upper portions clearances with guiding faces 50 for receiving elastic strips 38 (FIGS. 3 to 5). It will be seen particularly from FIGS. 3a to 3c and FIG. 4 that the interior of the profiles 30 is of the shell type so that matching halves form bores 32 for guiding the pins 22.

Details of this arrangement are evident from FIG. 3a with reference to FIGS. 3b and 3c. The righthand portion of FIG. 3a shows the basic or starting position of the pins 22 after the eraser means 36 has been operated; by contrast, the lefthand portion of FIG. 3a shows the working position of set pins 22 that is also seen in FIG. 4. The bores 32 guiding the pins 22 open at the top face 34 of the profiles 30, as is shown in the top view of FIG. 3c (without pins). A spring 28 biases each pin 22 towards its starting position, but if the respective pin is lifted by means of the pattern setter 16 (FIGS. 10 and 11), the locking means 26 retains the lifted pin such that is projects from the top face 34 by the tactual height h.

The locking means 26 is combined with the eraser means 36 using the strips 38 which have teeth 40 arranged at an acute angle relative to the strip plane (see FIG. 3b and FIGS. 4 to 7). The strips 38 are slidable along the guiding faces 50 between the profiles 30, the strip position governing whether the pins 22 are locked or released. Both the pins 22 and the teeth 40 are spaced by one and the same grid distance a. Each pin 22 includes a shoulder 42 by way of an undercut where an associated tooth 40 of a strip 38 will be locked when the respective pin 22 is lifted by the pattern setter 16. As the strip 38 is shifted by half the grid distance, i.e. by a/2, the shoulder 42 is released and springs 28 will return, in the erasing direction L, all the pins 22 of the row associated to that strip into their starting positions. Then the tips 24 are below the top face 34 and cannot be sensed.

Lateral shifting of the strips 38 is effected by the eraser means 36 which includes engaging dogs 46. These are borne by a stationary lower shaft 74 and can be pivoted, within limits, by means of an upper shaft 44 which also passes through the strips 38 so that these are shifted laterally as the dogs 46 are pivoted. Upper shaft 44 can be operated by the crank 48 (FIG. 1), e.g. via a driving eccentric (not shown). However, the invention also contemplates push-button operation by way of stepping means such as a notched disk, a ratchet wheel or the like including a detent spring or similar indexing means.

Details of the locking means 26 are shown in FIGS. 6 to 8. It will be seen that the teeth 40 can be folded out of the respective strip 38 in a bellied shape that will warrant definite locking (FIGS. 7 and 8) and will, in addition, reduce friction when the locking and erasing means 26, 36 are operated. This is due to the fact that only the convex tips of the teeth 40 can touch the adjacent structure, i.e. either the associated guiding face 50 of the respective profile 30 or—during the setting procedure—a point on the periphery of the associated pins 22. Preferably, the elastic strips 38 are of spring steel. The lower ends of the punched-out teeth 40 are expediently provided with run-out ends 76 (FIG. 6) in order to reduce the stress on the material.

A modified embodiment is depicted in FIG. 9 showing a tightly packed arrangement of the pins 22 which greatly contributes to a very compact overall design. Here, the strips 38 are guided in grooves 80 so as to directly engage the pins 22. As is also the case with the embodiments described above, the pins 22 have at or near their lower ends back-up rings or collars 72 supporting the compression springs 28. In a further variant (not shown), the individual springs 28 can be replaced by an elastic cord or ribbon, e.g. a rubber tape which is guided along and in the profiles 30 so as to bias all the pins 22 of the respective row towards the starting position.

An exemplary embodiment of the pattern setter 16 is shown in FIGS. 10 and 11. It comprises a frame or housing 78 supporting a plurality of stroke releasers 60 which may be solenoids in a staggered array. In the upper portion of frame 78, there are shafts 62 which bear pivotable levers 56. These can be of flat stock with points 58 which—at least in their elevated position—are aligned at the center of the pattern setter 16, as indicated by the dash-dotted line---in FIG. 10. Normally, the levers 56 are pulled down by tension springs 64. As the respective stroke releaser or solenoid 60 is actuated, its armature 66 moves the associated lever 56 up so that the point 58 which engages the lower end of a pin 22 in a row of character carrier 20 lifts said pin. The latter will then be locked in its set position so as to project from the top face 34 of the carrier 20. The stroke of the points 58 can be adjusted as desired in accordance with the armature travel of the electromagnet 60. The tactual height h is determined by the position of shoulder 42 on pin 22 and is within the range of 0 to 2 mm.

FIG. 11 further shows a slide lever 68 above frame 78 for moving the engaging dogs 46 (FIGS. 3a and 5) in order to operate the eraser means 36.

Wheras certain elements and arrangements have been illustrated singly or set off or in an isolated fashion, it must be stated and will be evident to the expert that the respective elements and arrangements are used in pluralities according to the actual dimensions of the device 10.

The scope of the invention includes modifications and combinations which deviate from the embodiments described. Thus the teeth 40 may be shaped as flat or partly bent folds which project from the strips 38. The folding edge leading to the end of such a tooth will act as a stiffener in the way of a bead, whereby the spring tooth will safely withstand even large loads, e.g. during printing. It is also important that devices or displays according to the invention which are to be used primarily as printing plates or as deep-drawing dies can be designed to receive at least one further staggered pin row each between the "normal" pin rows that are there, anyway. This makes possible the so-called inderdot braille print for the back page of a sheet whose front page is provided with other information to be sensed independently.

While referred embodiments have been illustrated and explained hereinabove, it should be understood that numerous variations and modifications will be apparent to one skilled in the art without departing from the principles of the invention which, therefore, is not to be construed as being limited to the specific forms described.

I claim:

1. A device (10) for tactually and visually displaying graphic information, such as braille texts, which device is composed of
  (a) a flat display having a top face (34) that is formed by the tops of a plurality of profiles (30) arranged in side-by-side parallel relationship to each other, each of said profiles having at least one elongated row of spaced apart vertical bores (32),
  (b) a pin (22) with a rounded upper tip (24) positioned within each of said bores (32), said bores (32) serving as guides for the vertical movement of said pins (22) in a direction perpendicular to top face (34),
  (c) spring means (28) associated with the lower end of each pin (22) which bias each pin (22) to its lowermost position so that the rounded tip (24) does not extend above the top of its surrounding bore (32),
  (d) stroke releasers (60) associated with each pin (22) which are electrically actuatable to allow each pin (22) to rise from its lower spring biased position to a upper position where the rounded tip (24) of the pin (22) projects above said top face (34),
  (e) locking means (26) to lock each pin (22) in said upper position,
  (f) eraser means (36) for returning each pin (22) from its said upper position to its spring-biased lower position, and
  (g) said locking means (26) and said eraser means for each elongated row of pins (22) comprising strip (34) that is mounted between said profiles (30) and beneath said top face (34) so as to be able to both engage and disengage the pins (22) in each elongated row of pins, each said strip (34) being movable with respect to its associated adjacent profile (30) in a direction parallel to said top face (34) and transverse to the longitudinal axes of said pins (22).

2. Device according to claim 1 wherein a shaft (44) transversely extends through the strips (38) and is connected via associated engaging dogs (46) to a frame and to a gear mechanism (48) for shifting relative to the profiles (30).

3. Device according to claim 1 wherein each strip (38) includes a row of elastic teeth (40) projecting from the plane of the strip at an acute angle and wherein each pin (22) has below its tip (24) at least one shoulder (42) for locking an adjacent tooth (40).

4. Device according to claim 3 wherein the teeth (40) are curved along the upper edge so as to be convex relative to the plane of the strip (38).

5. Device according to claim 3 wherein the teeth (40) are spaced at a grid distance (a) equal to that of the distance between adjacent pins (22) and wherein the strips (38) are laterally shiftable by half the grid distance (a/2) relative to the pin rows.

6. Device according to claim 1 wherein the profiles (30) are arranged at the same distance apart as the pin rows.

7. Device according to claim 1 wherein the profiles (30) are arranged in a form-fit series in a direction transverse to the pin rows, the tops of the profiles (30) jointly constituting the top face (34), which is perforated by the openings of the guiding bores (32).

8. Device according to claim 1 wherein the sides of each profile (30) includes receiving faces (50) for the strips (38).

9. Device according to claim 1 wherein the stroke releasers (60) are associated with a plurality of levers (56) having points (58) for engaging the lower ends of the pins (22).

* * * * *